J. M. CROWELL.
NUT LOCK.
APPLICATION FILED JUNE 1, 1911.
1,049,055.
Patented Dec. 31, 1912.
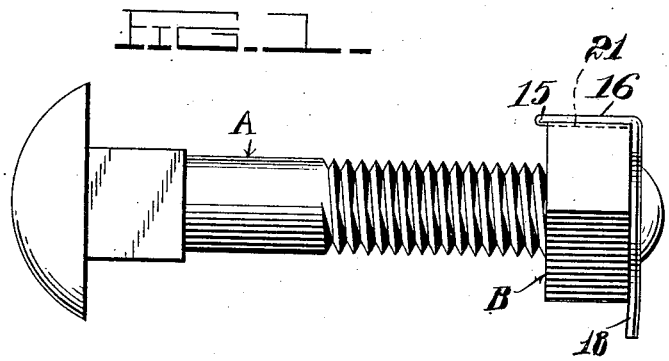
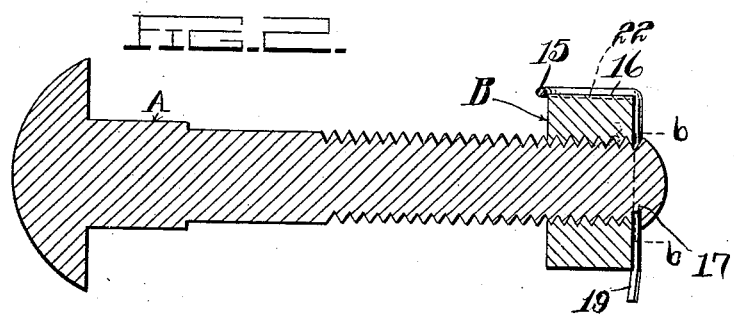
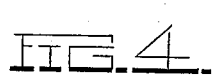 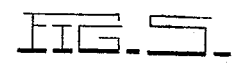
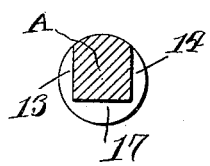 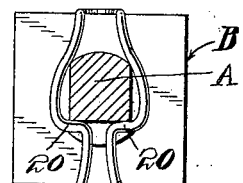
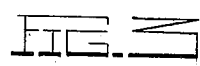
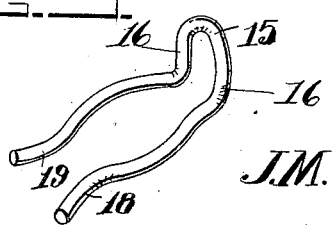
Inventor
J. M. Crowell.
Witnesses
F. H. Taylor
Henry T. Bright
By 
Attorneys

UNITED STATES PATENT OFFICE.

JOSEPH M. CROWELL, OF ROHRERSVILLE, MARYLAND.

NUT-LOCK.

1,049,055.　　　　Specification of Letters Patent.　　Patented Dec. 31, 1912.

Application filed June 1, 1911. Serial No. 630,563.

*To all whom it may concern:*

Be it known that I, JOSEPH M. CROWELL, a citizen of the United States, residing at Rohrersville, in the county of Washington, State of Maryland, have invented certain new and useful Improvements in Nut-Locks; and I do hereby declare the following to be a full, clear, and exact description of the invention, such as will enable others skilled in the art to which it appertains to make and use the same.

This invention relates to nut locks.

The object of the invention resides in the provision of a simple and inexpensive device of the character named, which can be readily and easily applied and which in use effectually holds the nut from turning off its bolt, the last named term is employed in its generic sense to include equivalent devices such as rods having threaded ends capable of receiving nuts.

With the above and other objects in view the invention consists in the details of construction and in the arrangement and combination of parts to be hereinafter more fully described and particularly pointed out in the appended claim.

In describing the invention in detail, references will be had to the accompanying drawings, wherein like characters of reference denote corresponding parts in the several views, and in which—

Figure 1 is an elevation of a bolt and nut provided with a lock embodying the invention. Fig. 2 is a longitudinal section of the structure shown Fig. 1. Fig. 3 is a detail perspective view of the locking device. Fig. 4, a transverse section through the bolt with the nut and locking device removed and illustrating the manner of grooving the bolt for the reception of the modified form of the locking device illustrated in Fig. 5, and Fig. 5, a view similar to Fig. 4 with the nut and modified form of locking device applied to the bolt.

Referring to the drawings, A indicates a bolt which has formed in its shank at diametrically opposite points parallel grooves 13 and 14 and a groove 17 connecting corresponding ends of the grooves 13 and 14 all of which are designed to receive the locking device. This locking device consists of a piece of spring wire which is bent upon itself into substantially U-shape, the arms of the U-shaped wire being bent at right angles near its bight 15 to form an angular extension 16. The arms of the locking device between the angular extension and their free ends are curved outwardly in opposite directions in a common plane and then inwardly at right angles to the grooves 13 and 14, as at 20, from which point they are bent out of the plane of the curved portions and diverge as shown at 18 and 19.

The nut carried by the bolt A is indicated at B and is of the square type. Each of the faces of the nut B is provided with a pair of longitudinal grooves 21 and 22 for a purpose that will presently appear.

In the use of the locking device, same is forced transversely of the bolt at a point outwardly of the nut so that the divergent arms receive between them the bolt and are forced apart by it, said arm passing along the transverse grooves 13 and 14 of the bolt. This operation is continued until the inwardly bent portions 20 pass into alinement with the groove 17 when the arms of the locking device will move toward each other under the influence of their own resiliency, the inwardly bent portions 20 of said arms entering the grooves 17 and the curved portions of said arms just moving into the grooves 13 and 14 respectively. When the lock is in this position its angularly bent extension 16 is disposed against one of the side faces of the nut B and the arms of said locking device seated in the longitudinal grooves 21 and 22 respectively so that the nut is held against accidental rotation.

By the engagement of the oppositely curved portions of the arms of the locking device in the transverse grooves 13 and 14 and the inwardly bent portions 20 in the groove 17 the lock is held against movement longitudinally of the bolt, while at the same time the inwardly bent portions 20 render it impossible to withdraw the locking device transversely of the bolt excepting by first forcing the ends of the arms of the lock apart.

What is claimed is:

The combination with a bolt having a pair of transverse grooves disposed in diametrically opposite relation and another transverse groove connecting corresponding ends of the first named pair of grooves, and a nut engaged with the bolt, of a U-shaped spring wire having its bight portion extending at right angles and lying against a side face of the nut, the adjacent portion of the arm of the U-shaped wire being curved in opposite directions and lying in the first named pair of grooves of the bolts respectively, the arms of the wire at the ends of said curved portions extending toward each other and engaging the second named groove of the bolt and then extending away from the bolt divergingly.

In testimony whereof, I affix my signature, in presence of two witnesses.

JOSEPH M. CROWELL.

Witnesses:
GEORGE W. RICE,
EDGAR D. LUMAN.

Copies of this patent may be obtained for five cents each, by addressing the "Commissioner of Patents Washington, D. C."